US011319204B2

(12) United States Patent
Zohar et al.

(10) Patent No.: US 11,319,204 B2
(45) Date of Patent: May 3, 2022

(54) DEVICE FOR CIRCULATING STORED DRINKING WATER WITH VORTEX CIRCULATION

(71) Applicant: Mayu Water Art Ltd., Hogla (IL)

(72) Inventors: Zeev Zohar, Herzliya (IL); Shay Eden, Hadera (IL); Gilad Horn, Kfar Uriyah (IL)

(73) Assignee: Mayu Water Art Ltd., Hogla (IL)

( * ) Notice: Subject to any disclaimer, the term of this patent is extended or adjusted under 35 U.S.C. 154(b) by 0 days.

(21) Appl. No.: 16/981,754

(22) PCT Filed: Mar. 19, 2019

(86) PCT No.: PCT/IL2019/050305
§ 371 (c)(1),
(2) Date: Sep. 17, 2020

(87) PCT Pub. No.: WO2019/180710
PCT Pub. Date: Sep. 26, 2019

(65) Prior Publication Data
US 2021/0032086 A1 Feb. 4, 2021

Related U.S. Application Data

(60) Provisional application No. 62/644,686, filed on Mar. 19, 2018.

(51) Int. Cl.
*B67D 1/00* (2006.01)
*B67D 1/08* (2006.01)

(52) U.S. Cl.
CPC ......... *B67D 1/0051* (2013.01); *B67D 1/0014* (2013.01); *B67D 1/0016* (2013.01);
(Continued)

(58) Field of Classification Search
CPC .. B67D 1/0051; B67D 1/0014; B67D 1/0016; B67D 1/0058; B67D 1/0888; B67D 220/0001; B67D 220/00015
(Continued)

(56) References Cited

U.S. PATENT DOCUMENTS 2,070,545 A * 2/1937 Gilbert ...................... B01F 7/26
366/164.6
2,350,534 A 6/1944 Rosinger
(Continued)

FOREIGN PATENT DOCUMENTS

CH 500136 1/1971
CN 206229283 6/2017
(Continued)

OTHER PUBLICATIONS

International Preliminary Report on Patentability dated Oct. 1, 2020 From the International Bureau of WIPO Re. Application No. PCT/IL2019/050305. (13 Pages).
(Continued)

*Primary Examiner* — Lien M Ngo

(57) ABSTRACT

A device for storing and circulating drinking water with vortex flow includes a base, a tank and an actuator housed in the base and configured to circulate the drinking water stored in the tank with vortex flow. The base includes an inlet port through which the drinking water is received and an outlet port through which the drinking water is dispensed. The tank is mounted on the base with a sealed engagement and is configured to store the drinking water. The tank has spherical or egg shape and includes an air inlet on an upper portion of the tank through which air can flow in and out of the tank.

23 Claims, 6 Drawing Sheets

(52) U.S. Cl.
CPC ......... B67D 1/0058 (2013.01); B67D 1/0888 (2013.01); *B67D 2210/0001* (2013.01); *B67D 2210/00015* (2013.01)

(58) Field of Classification Search
USPC ............... 222/1, 129.1, 146.6, 145.5, 145.6; 366/192, 194, 205, 206
See application file for complete search history.

(56) References Cited

U.S. PATENT DOCUMENTS

| | | | |
|---|---|---|---|
| 3,785,492 | A | 1/1974 | Mazza |
| 4,030,707 | A * | 6/1977 | Moreton ............... B01F 7/162 366/194 |
| 5,280,711 | A | 1/1994 | Motta et al. |
| 5,427,682 | A | 6/1995 | Vogel et al. |
| 5,694,341 | A | 12/1997 | Song |
| 5,735,600 | A * | 4/1998 | Wyness ............... B01F 13/02 366/101 |
| 6,171,490 | B1 | 1/2001 | Kim |
| 6,210,033 | B1 * | 4/2001 | Karkos, Jr. ............... H02K 7/11 366/274 |
| 6,332,706 | B1 | 12/2001 | Hall |
| 7,552,593 | B2 | 6/2009 | Smith |
| 8,888,963 | B2 | 11/2014 | Kamen et al. |
| 8,905,628 | B2 * | 12/2014 | Ledger ............... B01F 7/162 366/186 |
| 2003/0070991 | A1 | 4/2003 | Hatton |
| 2005/0185507 | A1 * | 8/2005 | Beesley ............... A47J 43/06 366/205 |
| 2006/0176765 | A1 * | 8/2006 | Pryor ............... A47J 43/046 366/192 |
| 2008/0089171 | A1 * | 4/2008 | Larsen ............... A47J 43/0727 366/206 |
| 2008/0148949 | A1 | 6/2008 | Wolfe |
| 2010/0059358 | A1 | 3/2010 | Ritchey et al. |
| 2010/0300868 | A1 | 12/2010 | Pirone |
| 2014/0334249 | A1 | 11/2014 | Radow |
| 2015/0305565 | A1 * | 10/2015 | Barfus, Jr. ............ B01F 15/0048 366/205 |
| 2018/0199760 | A1 | 7/2018 | Rai |

FOREIGN PATENT DOCUMENTS

| | | |
|---|---|---|
| DE | 3829774 | 3/1989 |
| DE | 102009029453 | 3/2011 |
| FR | 3007754 | 1/2015 |
| GB | 2505659 | 3/2014 |
| WO | WO 2017/219120 | 12/2017 |
| WO | WO 2019/180709 | 9/2019 |
| WO | WO 2019/180710 | 9/2019 |

OTHER PUBLICATIONS

International Search Report and the Written Opinion dated Jun. 24, 2019 From the International Searching Authority Re. Application No. PCT/IL2019/050305. (13 Pages).
International Search Report and the Written Opinion dated Jun. 27, 2019 From the International Searching Authority Re. Application No. PCT/IL2019/050304. (13 Pages).
Admin "Nikken PiMag Optimizer", Internet Leads Corp., Environmental / PiMag Water Technologies, 5 P., Apr. 21, 2008.
Mitte® "Mitte® Create Your Own Mineral Water, Just Like Nature", Mitte®, 7 P., 2018.
Natural Cures Store "Oxygen Water Cooler / Vitalizer", Natural Cures Store, 5 P., 2018.
Vibrant Vital Water™ "Gaia's Fountain", Vibrant Vital Water™, 8 P., 2017.
Vital Energy "TWISTER Power Water Whirler Enegstisieren Beverages: 600ml, Battery USB Rechargeable, Demountable and Dishwater-Proof", Vital Energy, Product Description, 3 P., Sep. 3, 2015.
Supplementary European Search Report and the European Search Opinion dated Nov. 11, 2021 From the European Patent Office Re. Application No. 19771805.9. (7 Pages).

* cited by examiner

DEVICE FOR CIRCULATING STORED DRINKING WATER WITH VORTEX CIRCULATION

RELATED APPLICATIONS

This application is a National Phase of PCT Patent Application No. PCT/IL2019/050305 having International filing date of Mar. 19, 2019, which claims the benefit of priority under 35 USC § 119(e) of U.S. Provisional Patent Application No. 62/644,686 filed on Mar. 19, 2018. The contents of the above applications are all incorporated by reference as if fully set forth herein in their entirety.

PCT Patent Application No. PCT/IL2019/050305 is also related to co-filed PCT Patent Application No. PCT/IL2019/050304 entitled "DEVICE FOR AERATING A BEVERAGE IN A CARAFE WITH VORTEX CIRCULATION". The contents of the above application are incorporated by reference as if fully set forth herein in their entirety.

FIELD AND BACKGROUND OF THE INVENTION

The present invention, in some embodiments thereof, relates to a device for enhancing drinking water with vortex flow and, more particularly, but not exclusively, to a dedicated tank of the device in which the drinking water is swirled with vortex flow.

There are various household products available for enhancing drinking water. Some products are known to enhance drinking water by purifying the water with carbon filters, reverse osmosis or ion exchange filters. Some known products mineralize water after purification to reinstate minerals removed during a purification process and to improve taste. It is also known to enhance drinking water by promoting vortex circulation.

U.S. Patent Application Publication No. 2003/070991 entitled "Apparatus for recirculating vortex water fountain" describes an apparatus for treating water through a magnetic field. The apparatus comprises an ampul capable of holding water, the ampul having an upper wide body and a lower narrow neck. The ampul has the surface structure and configuration to promote the water flow in a vortex. A water inlet located inside the ampul at its upper wide body portion is used to introduce water into the ampul. The water inlet is capable of dispensing water delivered to the ampul along the sides of the vortexing ampul thereby facilitating the flow of water in a vortex pattern.

U.S. Pat. No. 3,785,492 entitled "Method and apparatus for the preparation of beverages," describes an automatic machine, also for household use, which is adapted to the automatic preparation of imitation mineral waters. The machine essentially comprises a desalting device, a mineralizing unit which introduces in the desalted (also distilled) water a dosage unit of selected mineral salts, a carbonation device for saturating the remineralized water with carbon dioxide and a programming unit for selecting both the quantity and the quality of mineral water.

U.S. Patent Application Publication No. 2010/0300868 entitled "Device for producing drinking water," describes a device for producing drinking water. The device includes a supply means that provides a quantity of inlet water; a distillation system that distills the quantity of inlet water, a salt supply system in the form of a concentrated aqueous solution that supplies salts necessary for obtaining water which may be defined as drinking water and a mixing system that receives at least a part of the salt reserve and mixes it in a controlled manner with the quantity of distilled water, at the same time aerating the latter, so as to provide drinking water and a dispensing tap able to dispense this quantity of drinking water.

SUMMARY OF THE INVENTION

According to an aspect of some embodiments of the present invention there is provided a device for storing and circulating stored drinking water with vortex flow. According to embodiments of the present invention, the device includes a dedicated tank that is shaped and sized to continuously move substantially all the water stored in the device during vortex circulation without any substantial areas of stagnation.

In some example embodiments, the dedicated tank is an egg shaped or otherwise rounded vessel mounted on a casing including an impeller. Rotation of the impellor produces the vortex flow in the tank. The tank may be glass or other material through which a user may observe the vortex. The present inventors have found that the rounded structure of the egg shaped vessel or spherically shaped vessel may facilitate swirling substantially the entire volume of water within the vessel based on the impeller rotation and may leave little to no areas of stagnation in the vessel. In some example embodiments, inlet and outlet channels are formed in the casing at a position relative to the impeller so that water may be pumped in and out of the casing with impeller motion and without disturbing the vortex flow pattern in the tank. The water received through the inlet may be water purified with a water purification system.

According to an aspect of some embodiments of the present invention there is provided a system for automatic preparation of synthetic or man-made mineral waters from purified water accumulated in the device while being continuously swirled with vortex flow. Optionally, the system provides for preparing different types of man-made mineral water from an assortment of minerals, nutritional ingredients and medicinal ingredients based on user selection. In some example embodiments, the system additionally provides for re-hardening the water with a re-hardening filtration unit, selectively carbonizing the water, as well as selectively heating and cooling the water.

According to an aspect of some example embodiments, there is provided a device for circulating stored drinking water with vortex flow comprising: a base including: at least one port through which the drinking water is received and dispensed; a tank mounted on the base with a sealed engagement and configured to store the drinking water, wherein the tank is spherical or egg shaped and includes an air inlet on an upper portion of the tank through which air can flow in and out of the tank; and an actuator housed in the base and configured to circulate the drinking water stored in the tank with vortex flow.

Optionally, the device includes a sensor configured to monitor a volume or a level of the drinking water in the tank or to monitor a change in the volume or a change in the level of the drinking water in the tank.

Optionally, the device includes a valve configured to control flow of the drinking water through the at least one port; and a controller configured to control the valve based on input from the sensor.

Optionally, the controller is configured to maintain a pre-defined level of the drinking water in the tank based on controlling the valve.

Optionally, the sensor is configured to monitor a weight of the tank.

Optionally, the device includes a faucet configured to control dispensing of the drinking water through the at least one port.

Optionally, the actuator is an impeller.

Optionally, the at least one port includes an inlet port and an outlet port and the base includes the inlet port above or at a level of the impeller and the outlet port at a height of the impeller or below.

Optionally, the base includes a ring shaped partition that partitions an upper portion of the base including the inlet port from a lower portion of the base including the outlet port and wherein the ring shaped partition enables fluid communication between the upper portion and the lower portion.

Optionally, the device includes a stator configured to actuate rotation of the impeller, wherein the stator is positioned external to the base and wherein the impeller includes an impeller blade and a compartment including one or more permanent magnets.

Optionally, the stator includes at least two sets of electromagnets and a circuit configured to control activation of the at least two sets of electromagnets.

Optionally, the base includes an elevated portion that forms a ring shaped cavity under thereunder and wherein the stator is fitted in the cavity.

Optionally, a bottom portion of the tank is formed with lip defining an opening, wherein the lip is configured to form a sealed connection with the base.

Optionally, the air inlet is covered with an air filter.

According to an aspect of some example embodiments, there is provided a system for automatic preparation of man-made mineral waters, comprising: a device described herein; and a pump configured to dispense a defined volume of water from the device.

Optionally, the system includes a mineralization unit configured to selectively mineralize the defined volume of water, the mineralization unit comprising: a static mixing chamber configured to receive the define volume of water; a plurality of mineral ampoules configured to selectively dose minerals in the static mixing chamber as the volume of water flows through the static mixing chamber; and a controller configured to control selective dosing with the plurality of mineral ampoules based on user input.

Optionally, the system comprises at least one total dissolved ionized solids (TDS) sensor, wherein the controller is configured to adapt the dosing based on output from the TDS sensor.

Optionally, the system comprises a re-hardening filtration unit, configured to re-harden water stored in the device.

Optionally, the re-hardening filtration unit comprises a re-hardening filter and a carbon dioxide ($CO_2$) source, wherein the $CO_2$ source is configured to dose $CO_2$ in the water passing through the re-hardening filter.

Optionally, the re-hardening filtration unit includes in an exchange tank that is in fluid communication with the device.

Optionally, the impeller is configured to actuate exchange flow between the device and the exchange tank.

Optionally, the system comprises a temperature control unit configured to selectively heat or cool the volume of water.

Optionally, a $CO_2$ source configured to carbonate the water based on selection by a user. Optionally, an ultraviolet lamp or LED is configured to radiate the volume of water in the static mixing chamber.

Optionally, the pump is a diaphragm pump.

Optionally, the system is a purification system configured to purifying the water provided to the device.

Optionally, the purification system is based on reverse osmosis system or evaporation and condensation.

According to an aspect of some example embodiments, there is provided a method for automatic preparation of man-made mineral waters, the method comprising: circulating drinking water with vortex flow in a device described herein; receiving input for a user selecting one of a plurality of different mineral waters; channeling a defined volume of water from the device through a mineralization unit on demand; selectively dosing from a plurality of mineral ampoules into the defined volume of water based on the user input; and dispensing the volume of water that was dosed in the mineralization unit to the user.

Optionally, the method includes sensing a TDS level and adapting the dosing based on the TDS level.

Optionally, re-hardening the water stored in the device based on exchange flow between a re-hardening filtration unit and the device.

Optionally, the exchange flow is actuated based operation of the impeller.

Optionally, the method includes selectively heating or cooling the volume of water prior to mineralization of the water with the mineralization unit.

Optionally, the method includes radiating the volume of water with UV radiation.

Optionally, the method includes purifying the water supplied to the device with a purification unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
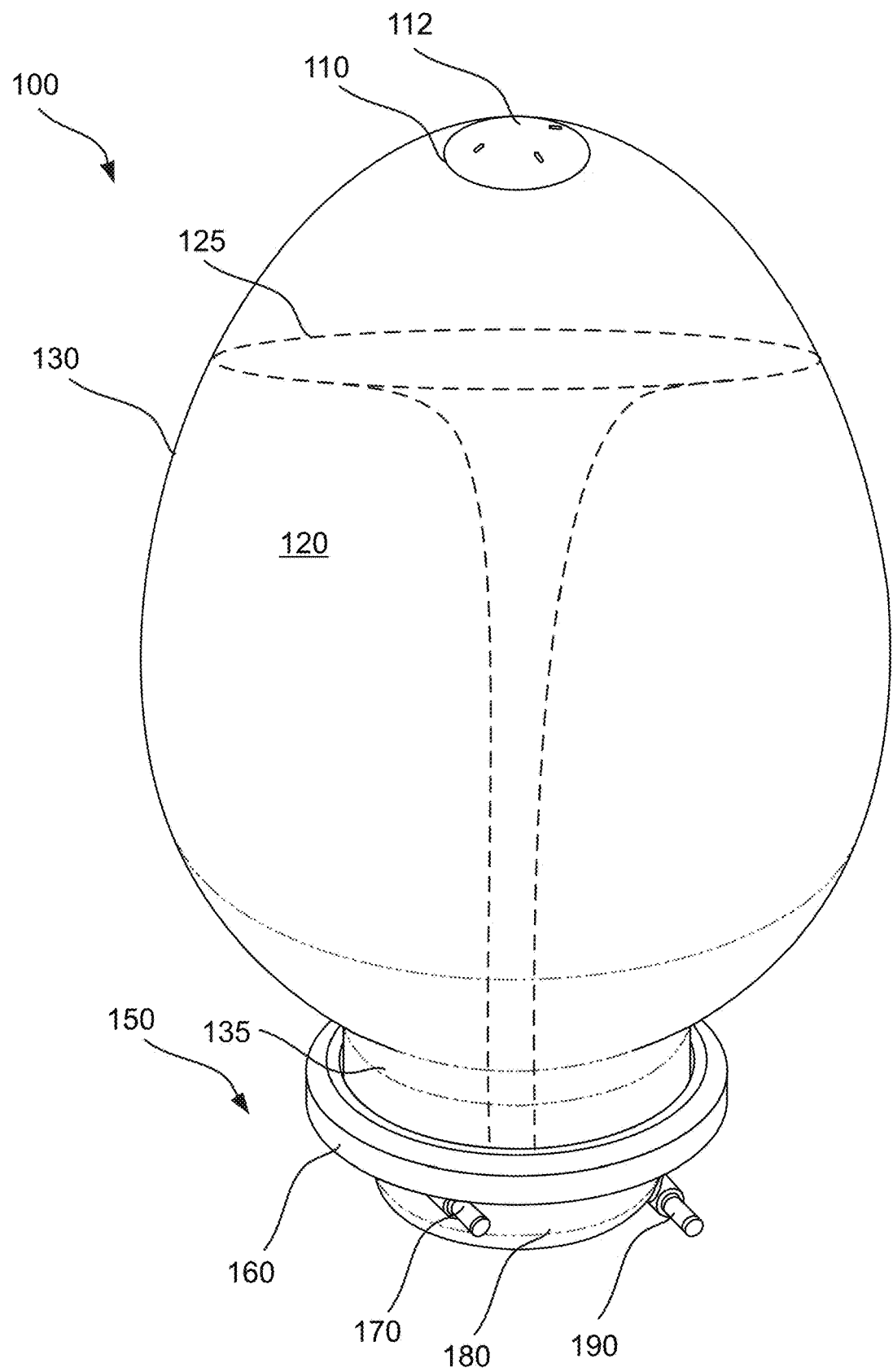
FIG. 1 is an example device that circulates (or swirls) drinking water with vortex flow in accordance with some example embodiments.

The present invention, in some embodiments thereof, relates to a device for enhancing drinking water with vortex flow and, more particularly, but not exclusively, to a dedicated tank of the device in which the drinking water is swirled with vortex flow.

According to embodiments of the present invention, the device includes an egg shaped or otherwise rounded tank, e.g. spherical formed from glass that is mounted on a casing that houses an impeller. The impeller induces the vortex flow in the tank. The egg shaped tank provides for imparting continuous flow of substantially all water stored in the device in the direction of the vortex flow without leaving areas in which the water is stagnant. The vortex flow may keep the water aerated, and may enable a cascade of oxidation reactions as well as introducing atmospheric $CO_2$ into the water. Introduction of atmospheric $CO_2$ into the water may increase rate of limestone based mineral dissolution. A portion of the egg shaped tank that is mounted on the casing includes an opening with an annular lip.

According to some example embodiments, the impeller includes impeller blades, a rotatable connection to a stationary axle fixed to the casing about which the impeller rotates and a compartment positioned below the impeller blades that houses a plurality of magnets.

According to some example embodiments, the casing supports the axle fixed at its base and includes an elevated portion that forms a ring shaped cavity under the casing and around the stationary axle. The ring shaped cavity is configured to receive a plurality of electromagnets that may couple with the magnets housed in the impellor compartment. The plurality of electromagnets and a circuit configured to control activation of the electromagnets form a stator configured to induce rotation of the impeller.

By positioning the stator outside the casing and mounting the impeller on a stationary axle, the device is less prone to leakage over time due mechanical wear of parts that rotate with respect to each other. Furthermore, the water may be contained in more favorable environment in that the parts of the device that come in contact with the water may be formed from material that does not readily interact with the water. For example, that tank may be formed from glass, the impeller and casing from ceramic and the axle from stainless steel. Rubber like material typically required to form a seal around a rotating axle protruding in the casing may be avoided in this manner. Additional optional materials may include one or more of ceramic plated material, silver plated material, a noble metal, glass, biopolymer and inorganic polymer.

An impeller housed in the base is configured to impart the vortex flow on the entire volume stored in the device and its velocity may be pre-defined based on size of the tank, shape of the tank and volume of the water in the tank. The impeller in the casing may be positioned at a height that may be substantially concealed via the glass tank on one hand while on the other hand imparting a desired movement on all the water both in the glass tank and the case.

In some example embodiments, the casing includes an annular wall for receiving the lip of the tank with a sealed engagement and for housing the impeller. At least one inlet channel and at least one outlet channel may be formed through the casing. Water for filling the tank may be received through an inlet channel and water to be dispensed for drinking may be dispensed on demand through the outlet channel. Typically, water in the tank may be maintained at a constant volume by initiating filling of the tank in response to water being dispensed from the tank. Optionally, weight of the tank is monitored with one or more sensors embedded in a base on which the tank is positioned and the tank is refilled based on detecting a reduction in weight.

In some example embodiments, a ring shaped partition extends out from the annular wall toward the impeller and forms a partial division between an upper portion of the casing including the inlet channel and the lower portion including the outlet channel. In example embodiments, the outlet channel is positioned below the impeller and inlet channel is at the level of the impeller or above so that a spatial pressure differences induced by the impeller may be harnessed for actuating the exchange flow in place or in addition to a circulation pump. The inlet may receive water from various water sources, e.g. a tap water source or a purification system. Optionally, the device is configured to be in continuous fluid communication with a re-hardening filtration unit. Optionally, the impellor motion, and direction of water flow together with defined positioning of the inlet and outlet ports in the casing in relation to the impeller actuates exchange flow between the device and the re-hardening filtration unit. In some example embodiments, the ring shaped partition enhances the pressure gradient between the upper and lower portion of the casing.

In some example embodiments, the tank additionally includes an opening above the water level stored in the tank, e.g. at the top to provide air flow in and out of the tank and an air filter, e.g. a ceramic filter or High Efficiency Particulate Air (HEPA) filter installed on the opening. Optionally, the opening is covered with a cover including air hole openings.

According to embodiments of the present invention the system for automatic preparation of man-made mineral waters is configured to selectively mineralize a volume of water dispensed from the device based on user selection. The system may include a mineralization unit installed with a plurality of ampoules, tablets, globules or powders having different compositions. Based on user selection, the mineralization unit may dose a desired composition of minerals to a volume of water being dispensed and flowing through a static mixing chamber. The dosing may be from one of the plurality of ampoules or may be from a combination of ampoules. Optionally, the system additionally monitors mineral content of the water flowing through the system with one or more total dissolved ionized solids (TDS) sensors and adapts the dosing based on the detected content. The system may also include an ultraviolet (UV) lamp or light source, e.g. an UV Light Emitting Diode (LED) that may radiate the dispensed volume of water. Optionally, the UV lamp is positioned to radiate the water in the static mixing chamber.

In some example embodiments, the system additionally includes a re-hardening filtration unit. Optionally, the re-hardening filtration unit may include a dolomite or limestone filter and may also include a $CO_2$ source configured to enrich the water being filtered with $CO_2$. Optionally, the re-hardening filtration unit is housed in an exchange tank that is in fluid communication with the device for storing the water with vortex circulation. Optionally, the vortex circulation actuates the exchange flow between the device and the re-hardening filtration unit. The $CO_2$ source may also be used to provide carbonated water on demand.

Optionally, the system additionally includes heating and cooling system to provide water at a user selected temperature. Optionally, the heating and cooling is performed prior to mineralization with the mineralization unit. Optionally, the system additionally includes a carbonation system to selectively carbonate the water prior to mineralization based on user preference.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Reference is now made to the drawings. FIG. 1 shows an example device that circulates (or swirls) drinking water with vortex flow in accordance with some example embodiments. Device 100 includes a tank 130 mounted on a base 150 for storing water 120. Base 150 includes an impeller that swirls water 120 and forms vortex 125. According to embodiments of the present invention, tank 130 is defined to have a rounded shape, e.g. an egg shape or a spherical shape. Optionally tank 120 is glass. Due to the rounded shape of tank 130, vortex 125 may impart movement to substantially an entire volume of water 120 in device 100 without areas of stagnation that may typically be formed around edges of a cylindrical or cubically shaped tank. Circulation of the water is thereby improved based on the rounded shape of the tank 130. Optionally, tank 130 includes an opening 110 at top of tank 130 above a water level of water 125 for air exchange. In some example embodiments, opening 110 is covered with an air filter 112, e.g. alumina or HEPA type air filter to purify air that enters tank 130. Optionally tank 130 is sized for household use and stores between 1-10 liters of water.

According to some example embodiments, tank 130 includes lip 135 that defines an opening at the bottom of tank 130 to engage with base 150. Engagement between tank 130 and base 150 is a sealed engagement. Optionally, an annular clamping element 160 is configured to secure tank 130 to base 150. Lip 135 is typically shallow and may have a height of 1-5 cm.

Figure 2A:
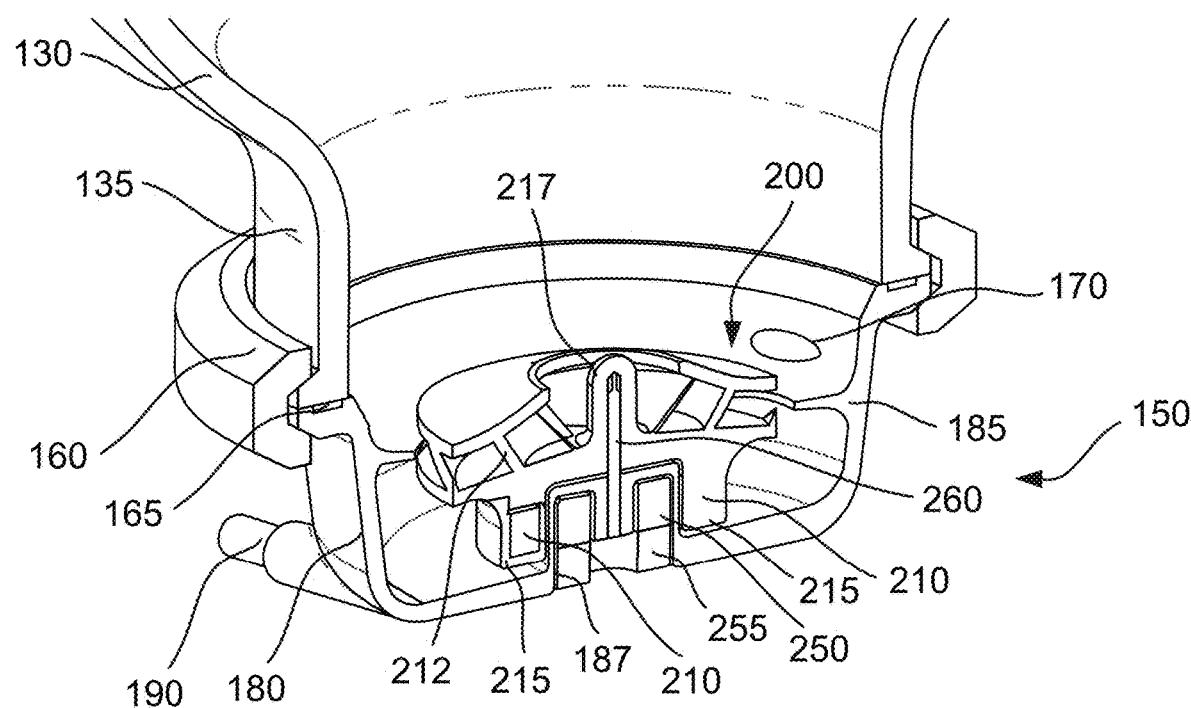
FIGS. 2A and 2B are cross-sectional views of a base for the example device in accordance with some example embodiments.
Figure 2B:
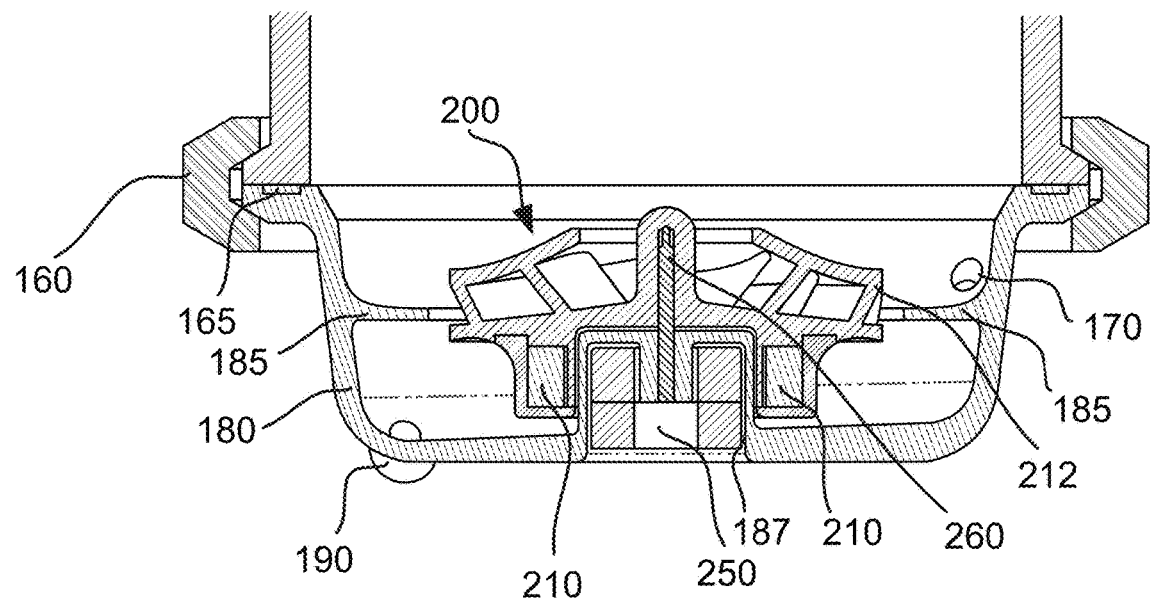

According to some example embodiments, base 150 includes a casing 180 that houses the impeller to impart vortex movement of water 120 that forms vortex 125, at least one inlet port 170 through which water is received and replenished in tank 130 and an outlet port 190 through which water 120 is dispensed for drinking. In some example embodiments, the inlet port 170 is positioned at a level of the impeller housed in housing 180 or above the impeller and outlet port 190 is positioned below a level of the impeller. Optionally, the base additionally includes a stator for operating the impeller that is external to casing 180. The impeller and stator is shown in FIGS. 2A and 2B discussed in further detail herein below. In some example embodiments, casing 180 is formed from a ceramic material, from stainless steel, glass or other material that is known not to impart a bad taste or toxins in the water. The stator may be powered by a battery or may be plugged into a power outlet.

FIGS. 2A and 2B show cross-sectional views of a base for the example device in accordance with some example embodiments. In some example embodiments, an impeller 200 is housed in casing 180 and may be rotatably mounted on a stationary axle 260 fixed to casing 180. Impeller 200 may be formed from a ceramic material, from stainless steel, gold plated, silver plated, noble metal or other material that is known not to impart a bad taste or toxins in the water. According to some example embodiments, impeller 200 includes impeller blades 212, a rotatable connection 217 to axle 260 and one or more compartments 215 that house a plurality of permanent magnets 210.

Optionally, permanent magnets 210 of impeller 200 may be fully encased in compartments 215 so that there is no physical contact between the water and the magnets 210. Axle 260 is embedded in casing 180 but does not penetrate out of casing 180. In some example embodiments, impeller 200 is positioned under lip portion 135 in a manner that substantially conceals visualization of impeller 200 to a user looking at tank 130.

According to some example embodiments, a plurality of electromagnets 250 are positioned under casing 180 (outside of casing 180) in cavity 187 formed under casing 180 and around axle 260. Electromagnets 250 and circuit together form a stator for inducing rotation of impeller 200 based on magnetic coupling between permanent magnets 210 and electromagnets 250.

In some example embodiments, a ring shaped partition 185 extends out from the annular wall of casing 180 toward impeller 200 and forms a partial division between an upper portion of casing 180 including the inlet port 170 and a lower portion including the outlet port 190. As impeller blades 212 rotate pressure builds under impeller blades 212 and partition 185. The pressure buildup may assist in pumping out water through outlet 190. Furthermore, as impeller blades 212 rotate, flow of water near walls of casing 180 is generally parallel to the walls so that a Venturi effect may occur at inlet port 170 that suctions flow through inlet port 170 into casing 180 and tank 130. Partition 185 may assist in preserving the pressure gradient between an upper and lower portion of casing 180.

Typically, a seal or gasket 165, e.g. silicon is positioned between tank 130 and rim 160 to seal the fluid connection. Optionally, a surface of housing 180 configured to engage with tank 130 includes an indent in which a seal or gasket 165 is positioned. The indent provides for holding seal 165 in place during assembly and may also reduce surface area of seal 165 so that comes into contact with the water in tank 130 and housing 180.

Figure 3A:
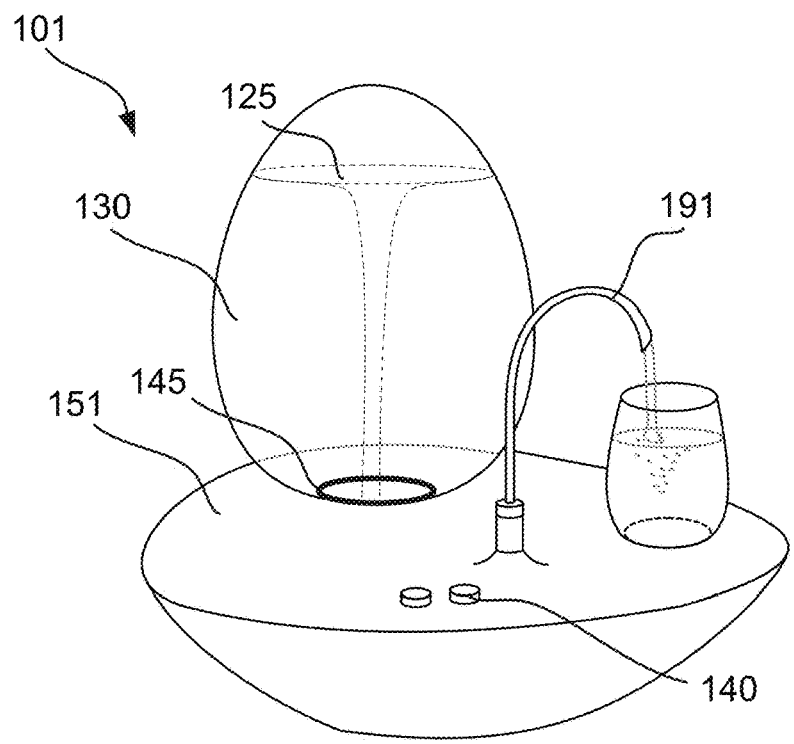
FIGS. 3A and 3B are example devices with example dispensers in accordance with some example embodiments.
Figure 3B:
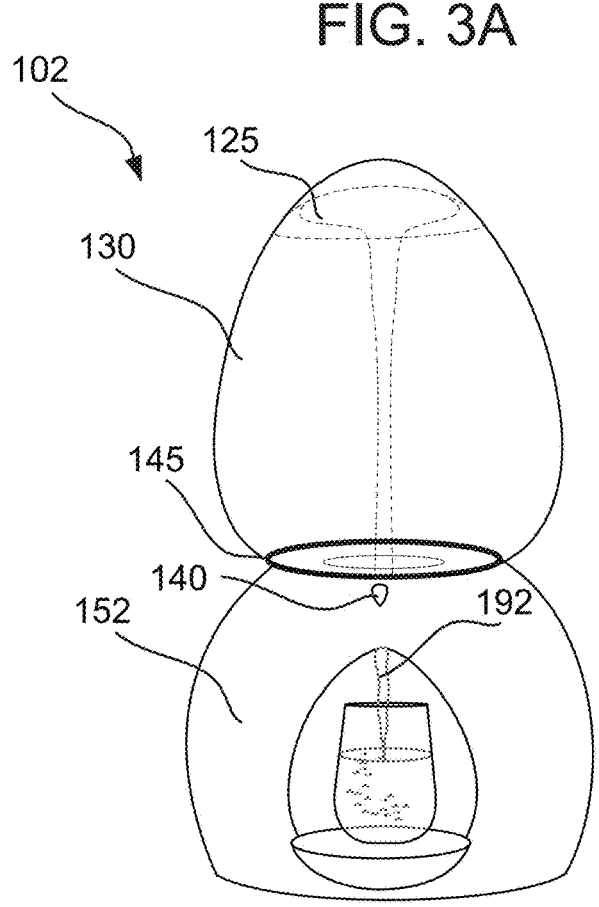

FIGS. 3A and 3B show example devices with example dispensers in accordance with some example embodiments. According to some example embodiments, tank 130 maintains a constant volume by replenishing water through the inlet port when the water is dispensed. In some example embodiments, tank 130 rests on a sensor 145 that monitors weight of the tank, level of the tank and/or volume of the tank. Optionally sensor 145 is configured to monitor changes in the amount of water in the tank. Sensor 145 may be housed in base 151 or base 152. Optionally, based on the weight, volume of water in tank 130 may be determined. Sensor 145 is shown as a ring shaped sensor but may be any other shape. The water is dispensed with a faucet connected to outlet port, e.g. faucet 191 (FIG. 3A) or faucet 192 (FIG. 3B). The base of the device including the impeller may have various ornamental shapes, e.g. base 151 (FIG. 3A) and base 152 (FIG. 3B). The base may include one or more user selection buttons 140 for dispensing water, e.g. cold, hot or carbonated water.

Figure 3C:
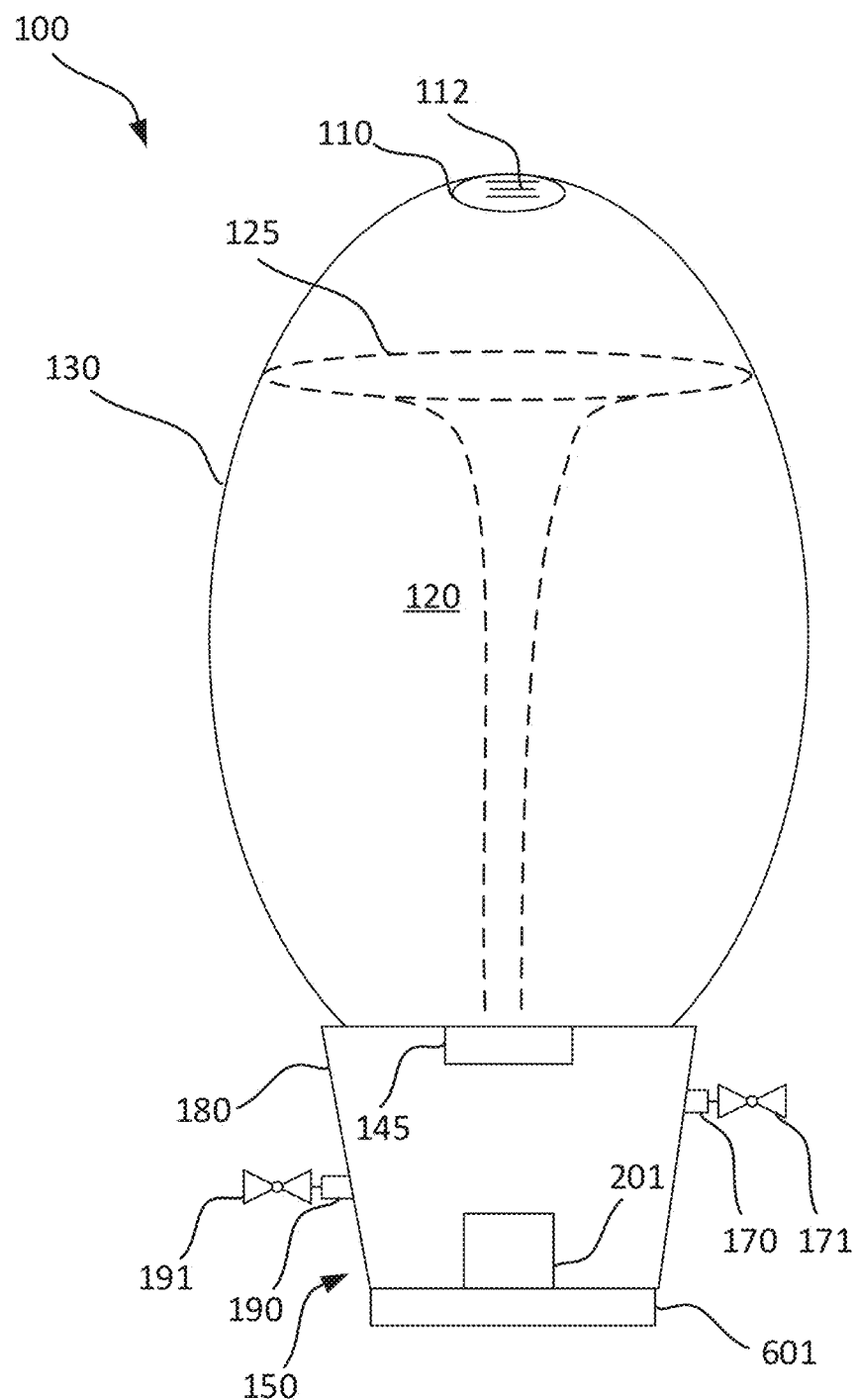
FIG. 3C is a simplified schematic drawing of an example device in accordance with some example embodiments.

FIG. 3C shows a simplified schematic drawing of an example device in accordance with some example embodiments. FIG. 3C is similar to FIG. 1 and schematically shows additional example features of device 100. According to some example embodiments, device 100 includes an actuator 201 housed in base 150 that swirls water 120 and forms vortex 125. Actuator 201 may be an impeller as described herein or may alternately be a pump with dedicated nozzles that are controlled to swirl water 120 and form vortex 125. According to some example embodiments, device 100 is operated and controlled with a circuit 601. Circuit 601 may control operation of actuator 201 and may also control water flow into and optionally out of tank 130. In some example embodiments, circuit 601 is configured to control filling tank 130 based on controlling a valve 171 associated with inlet port 170. In some example embodiments, sensor 145 monitors a weight, volume or level of water 120 in tank 130. Circuit 601 may receive input from sensor 145 and based on the input identify when water has been dispensed via outlet port 190 and/or when tank 130 needs refilling. Refilling may be performed automatically based on input from sensor 145. Dispensing water 120 from tank 130 may be based on a user opening manually or electronically opening valve or faucet 191. One or more of valves 171 and 191 may be housed in casing 180 of base 150 or may be external to the casing. Optionally, valve 191 is externally controlled (may not be controlled by circuit 601.

Figure 4:
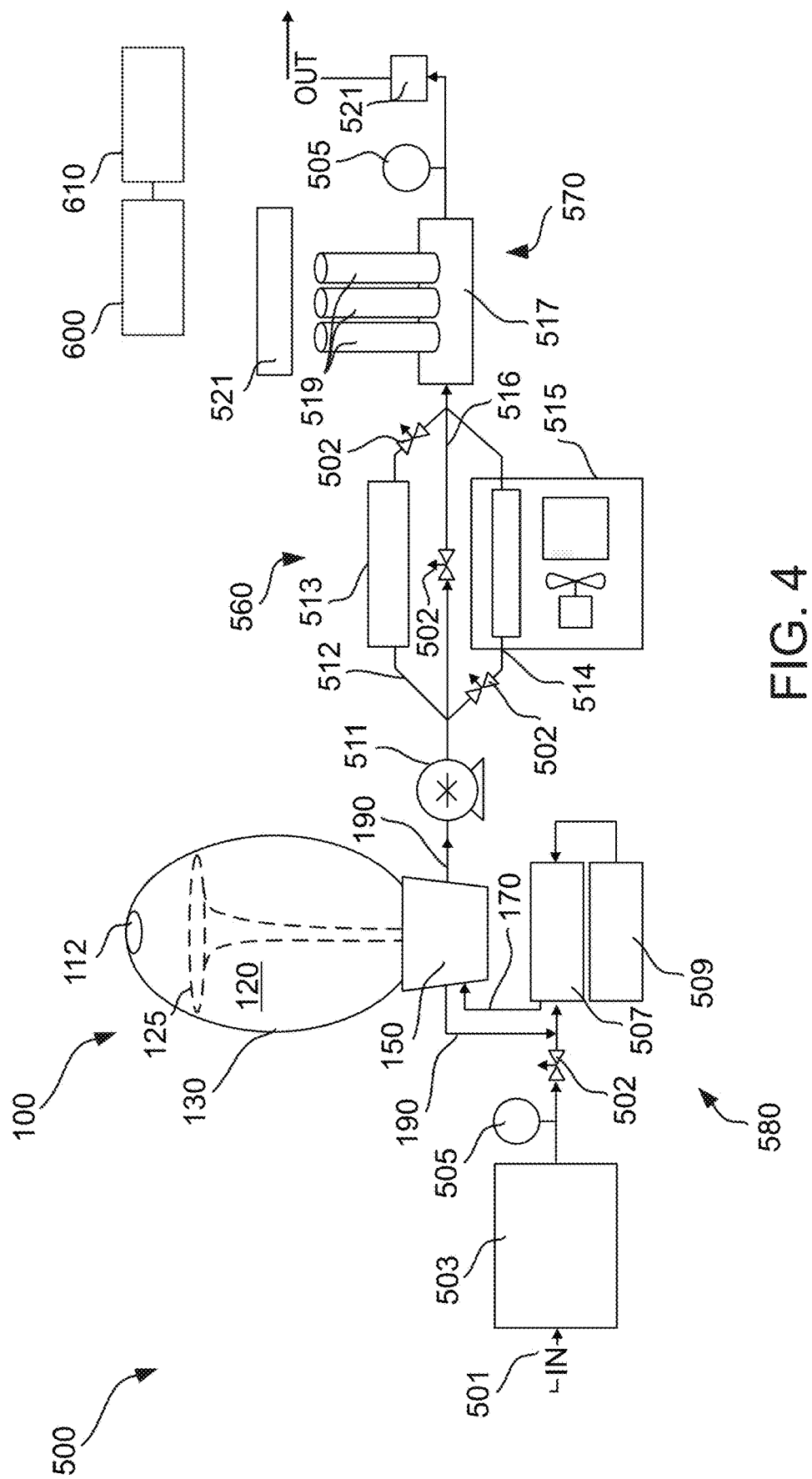
FIG. 4 is a schematic flow diagram of an example system for automatic preparation of man-made mineral waters in accordance with some example embodiments.

FIG. 4 shows a schematic flow diagram of an example system for automatic preparation of man-made mineral waters in accordance with some example embodiments. According to some example embodiments, water in device 100 is filled from a water source 501 such as tap water that may first be purified with a purification system 503. Purification system 503 may be a reverse osmosis system or may be a filtration system such as carbon filter, an ion exchange filter system or an evaporation condensation distiller. Optionally a TDS meter 505 is installed on an outlet channel from purification system 503. Typically, purification system 503 reduces the TDS value of the water. A solenoid 502 may control flow into device 100 to maintain a substantially constant volume of water 120 in tank 130.

In some example embodiments, device 100 is configured to exchange water with a re-hardening filtration unit 580 include re-hardening filter 507 and optionally a $CO_2$ source 509. Prior to filtration or during exchange, the water may be dosed with $CO_2$ from $CO_2$ source 509. In some example embodiments, water is dosed as it enters tank 130. Optionally, a regulator controls a valve of a pressurized tank including $CO_2$ and opens the valve whenever tank 130 is being filled. Enriching the water with $CO_2$ may improve operation of the re-hardening filter. Optionally, the impeller motion of device 100 actuates the continuous exchange flow between re-hardening filter 507 and tank 130. The continuous exchange and flow through re-hardening filter 507 together with optional $CO_2$ dosing may significantly increase the magnesium and calcium carbonate concentration in tank 130. Typically the re-hardening filter 507 is a dolomite or limestone type filter.

According to some example embodiments, in response to a user opening or actuating a faucet 521, a pump 511, e.g. a diaphragm pump, positive displacement pump and dosing pump, pumps water from device 100 through the system to the user in defined volumes. Optionally, output of the system is 0.5-3.0 liters/min. Optionally, the volume of water may be directed through a temperature control unit 560. Based on user selection, the water may be channeled through one or more of a cooling line 514 with cooler 515, a heating line 512 with heater 513 and line 516 with no heating or cooling. Temperature selection may be made with a user interface 610. Flow through each of the temperature lines may be controlled with a dedicated valve, e.g. solenoid 502.

In some example embodiments, the dispensed volume of water is also mineralized with mineralization unit 570. In some example embodiments, mineralization unit 570 includes a plurality of mineral ampoules 519, tablets or powders controllably dispensed into a static mixer 517 with a piston or peristaltic pump. A user may select one of a plurality of formulas for mineralization with user interface 610. Based on the selection, one or more mineral ampoules 519 may dispense minerals in static mixing chamber 517. Optionally, water in the static mixer is UV treated with a UV lamp or UV Light Emitting Diode (LED) 521. Prior to delivering the water, TDS level may be monitored based on reading from a TDS meter 505. In some example embodiments, $CO_2$ source 509 may be used to dispense carbonated water on demand. Output from the TDS meter 505 at the end of the flow line may be applied to adjust dosing of the mineral ampoules in subsequent volumes of water.

According to example embodiments, the system includes a controller 600 that may control operation of TDS meter 505, solenoids 502, device 100, pump 511, temperature control unit 560 and a mineralization unit 570. User interface 610 provides input to controller 600 and also output from controller 600. User interface 610 may be positioned on the system but may also be remote. For example, a user may control system 500 with a smart phone or computer tablet.

Figure 5:
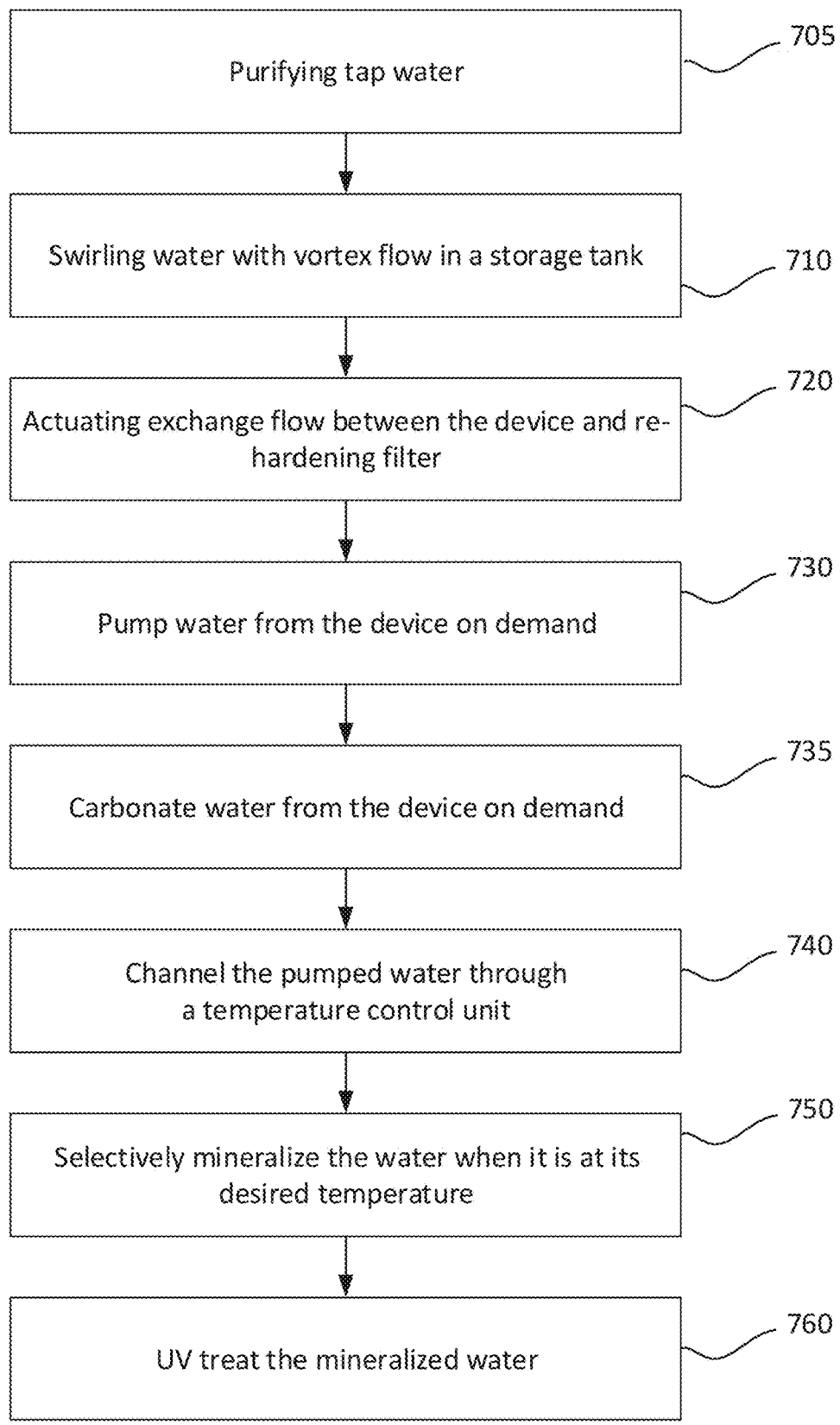
FIG. 5 is a simplified flow chart of an example method for preparing man-made mineral water in accordance with some example embodiments.

FIG. 5 shows a simplified flow chart of an example method for preparing man-made mineral water in accordance with some example embodiments. According to some example embodiments, a purification system is configured to purify tap water and accumulate the purified water in a device (block 705). According to some example embodiments, purified drinking water is continuously swirled with vortex flow while stored in the device (block 710). In some example embodiments, the water may be enriched with magnesium and calcium carbonate by inducing exchange flow between the device and re-hardening filtration unit (block 720).

When a user wants to extract water from the device, water is pumped out of the device on demand (block 730). Optionally, the water may be carbonated (based on user selection) with a $CO_2$ source used with the re-hardening filter (block 735). Optionally, the water may be selectively cooled or heated by channeling the pumped water through a temperature control unit (block 740). Optionally, heating and cooling is performed prior to mineralizing the water so that dosing of the minerals may be adapted to the temperature of the water. According to some example embodiments, a mineralization unit selectively mineralizes the water based on input from the user as well as based on TDS sensor readings taken at the inlet to the device (block 750). Optionally, the mineralized water may be UV treated (block 760) prior to dispensing (block 770).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A device for circulating stored drinking water with vortex flow comprising:
   a base including at least one port through which the drinking water is received and dispensed;
   a tank mounted on the base with a sealed engagement and configured to store the drinking water, wherein the tank is spherical or egg shaped and includes an air inlet on an upper portion of the tank through which air can flow in and out of the tank; and
   an actuator housed in the base and configured to circulate the drinking water stored in the tank with vortex flow, the device further comprising a sensor configured to monitor a volume or a level of the drinking water in the tank or to monitor a change in the volume or a change in the level of the drinking water in the tank.

2. The device according to claim 1, comprising:
   a valve configured to control flow of the drinking water through the at least one port; and
   a controller configured to control the valve based on input from the sensor.

3. The device according to claim 2, wherein the controller is configured to maintain a pre-defined level of the drinking water in the tank based on controlling the valve.

4. The device according to claim 1, wherein the actuator is an impeller.

5. The device according to claim 4 wherein the at least one port includes an inlet port and an outlet port and wherein the inlet port is above or at a level of the impeller and the outlet port is at a height of the impeller or below.

6. The device according to claim 5, wherein the base includes a ring shaped partition that partitions an upper portion of the base including the inlet port from a lower portion of the base including the outlet port and wherein the ring shaped partition enables fluid communication between the upper portion and the lower portion.

7. The device according to claim 4, comprising:
   a stator configured to actuate rotation of the impeller, wherein the stator is positioned external to the base and wherein the impeller includes an impeller blade and a compartment including one or more permanent magnets.

8. The device according to claim 7, wherein the stator includes at least two sets of electromagnets and a circuit configured to control activation of the at least two sets of electromagnets and wherein the base includes a cavity thereunder and wherein the stator is fitted in the cavity.

9. The device according to claim 1, wherein a bottom portion of the tank is formed with lip defining an opening, wherein the lip is configured to form a sealed connection with the base.

10. The device according to claim 1, wherein the air inlet is covered with an air filter.

11. A system for automatic preparation of man-made mineral waters, comprising:
    a device according to claim 1; and
    a pump or faucet configured to dispense a volume of water from the device.

12. The system according to claim 11 comprising:
    a mineralization unit configured to selectively mineralize the defined volume of water, the mineralization unit comprising:
    a static mixing chamber configured to receive the define volume of water;
    one or more mineral ampoules configured to selectively dose minerals in the static mixing chamber as the volume of water flows through the static mixing chamber; and
    a controller configured to control selective dosing with the one or more mineral ampoules based on user input.

13. The system according to claim 12 comprising at least one total dissolved ionized solids (TDS) sensor, wherein the controller is configured to adapt or monitor the dosing based on output from the TDS sensor.

14. The system according to claim 11, comprising a re-hardening filtration unit, configured to re-harden water stored in the device and an exchange tank that is in fluid communication with the device.

15. The system according to claim 14, wherein the re-hardening filtration unit comprises: a re-hardening filter and a carbon dioxide ($CO_2$) source, wherein the $CO_2$ source is configured to dose $CO_2$ in the water passing through the re-hardening filter.

16. The system according to claim 11, comprising at least one of:
    a temperature control unit configured to selectively heat or cool the volume of water;
    a $CO_2$ source configured to carbonate the water based on selection by a user;
    an ultraviolet lamp or LED configured to radiate the volume of water; and
    a purification system configured to purifying the water provided to the device.

17. A method for automatic preparation of man-made mineral waters, the method comprising:
    circulating drinking water with vortex flow in a device according to claim 1;
    receiving input for a user selecting one of a plurality of different mineral waters;
    channeling a volume of water from the device through a mineralization unit on demand;
    selectively dosing from one or more mineral ampoules into the volume of water based on the user input; and
    dispensing the volume of water that was dosed in the mineralization unit to the user.

18. The method according to claim 17 comprising sensing a TDS level and adapting the dosing based on the TDS level.

19. The method according to claim 17 comprising re-hardening the water stored in the device based on exchange flow between a re-hardening filtration unit and the device.

20. The method of claim 19, wherein the actuator configured to circulate the drinking water stored in the tank with vortex flow is an impeller and wherein the exchange flow is actuated based on operation of the impeller.

21. The method according to claim 17, comprising at least one of:
    selectively heating or cooling the volume of water;
    radiating the volume of water with a UV radiation;
    purifying the water supplied to the device with a purification unit; and
    carbonating the water with a $CO_2$ source.

22. The system according to claim 14, wherein the actuator is an impeller and the impeller is configured to actuate exchange flow between the device and the exchange tank.

23. A system for automatic preparation of man-made mineral waters, comprising:
    a device according to claim 6; and
    a re-hardening filtration unit, configured to re-harden water stored in the device; and an exchange tank that is in fluid communication with the device, wherein the impeller is configured to actuate exchange flow between the device and the exchange tank.

* * * * *